(12) United States Patent
Shen

(10) Patent No.: US 8,347,013 B2
(45) Date of Patent: Jan. 1, 2013

(54) INTERFACE CARD WITH EXTENSIBLE INPUT/OUTPUT INTERFACE

(75) Inventor: Hung-Ta Shen, Taipei County (TW)

(73) Assignees: Armorlink SH Corp., Min-Sing-Sin-Jhuang Industrial District, Shang-Hai (CN); IEI Technology Corp., Xizhi Dist., New Taipei (TW)

( * ) Notice: Subject to any disclaimer, the term of this patent is extended or adjusted under 35 U.S.C. 154(b) by 395 days.

(21) Appl. No.: 12/564,056

(22) Filed: Sep. 22, 2009

(65) Prior Publication Data
US 2010/0312937 A1 Dec. 9, 2010

(30) Foreign Application Priority Data
Jun. 9, 2009 (TW) ................. 98119157 A

(51) Int. Cl.
*H05K 7/10* (2006.01)
(52) U.S. Cl. ............ 710/301; 710/300; 710/302
(58) Field of Classification Search .......... 710/300–302
See application file for complete search history.

(56) References Cited

U.S. PATENT DOCUMENTS

| | | | | |
|---|---|---|---|---|
| 6,978,333 B2 * | 12/2005 | Timmins et al. | ............... | 710/301 |
| 6,983,340 B1 * | 1/2006 | Hermanson et al. | .......... | 710/301 |
| 7,492,816 B1 * | 2/2009 | Wong et al. | .................. | 375/232 |
| 7,502,470 B2 * | 3/2009 | Hanko et al. | .................. | 380/200 |
| 7,631,134 B2 * | 12/2009 | Jian | ............................... | 710/301 |
| 8,031,169 B2 * | 10/2011 | Hoerl | ............................ | 345/156 |
| 8,040,433 B2 * | 10/2011 | Matsui et al. | ................. | 348/441 |
| 2006/0046534 A1 * | 3/2006 | Birmingham | ................ | 439/76.1 |
| 2007/0263713 A1 * | 11/2007 | Aronson | ....................... | 375/229 |
| 2010/0253840 A1 * | 10/2010 | Nave | ............................. | 348/500 |

OTHER PUBLICATIONS

IEI—"HDC-304E—PCI express video/audio capture card with four HDMI input channels"; 1 page, No Date Provided.*
Extron Electronics—"HDMI 101—HDMI Cable Equalizer"; 2 pages, Dated 2007.*
Blackmagicdesign—"Intensity Pro Operation Manual"; 34 pages, Dated Nov. 2007.*
"High-Definition Multimedia Interface Specification Version 1.1"; 206 pages, Dated May 20, 2004.*

* cited by examiner

Primary Examiner — Brian Misiura
(74) Attorney, Agent, or Firm — Winston Hsu; Scott Margo

(57) ABSTRACT

An interface card with extensible input/output interface used for being inserted into a slot of a mainboard and for transmitting a bus signal to a remote backplane having a plurality of input/output interfaces, including a repeater, a serializer, a processor, and an interface unit is disclosed. The repeater is used for enhancing the bus signal. The serializer is connected to the repeater and is used for serializing the bus signal. The processor is connected to both the repeater and the serializer and is used for monitoring the transmission of the bus signal and for compensating the bus signal. The interface unit is connected to both the repeater and the serializer and is used for transmitting the serialized bus signal to the remote backplane.

3 Claims, 1 Drawing Sheet

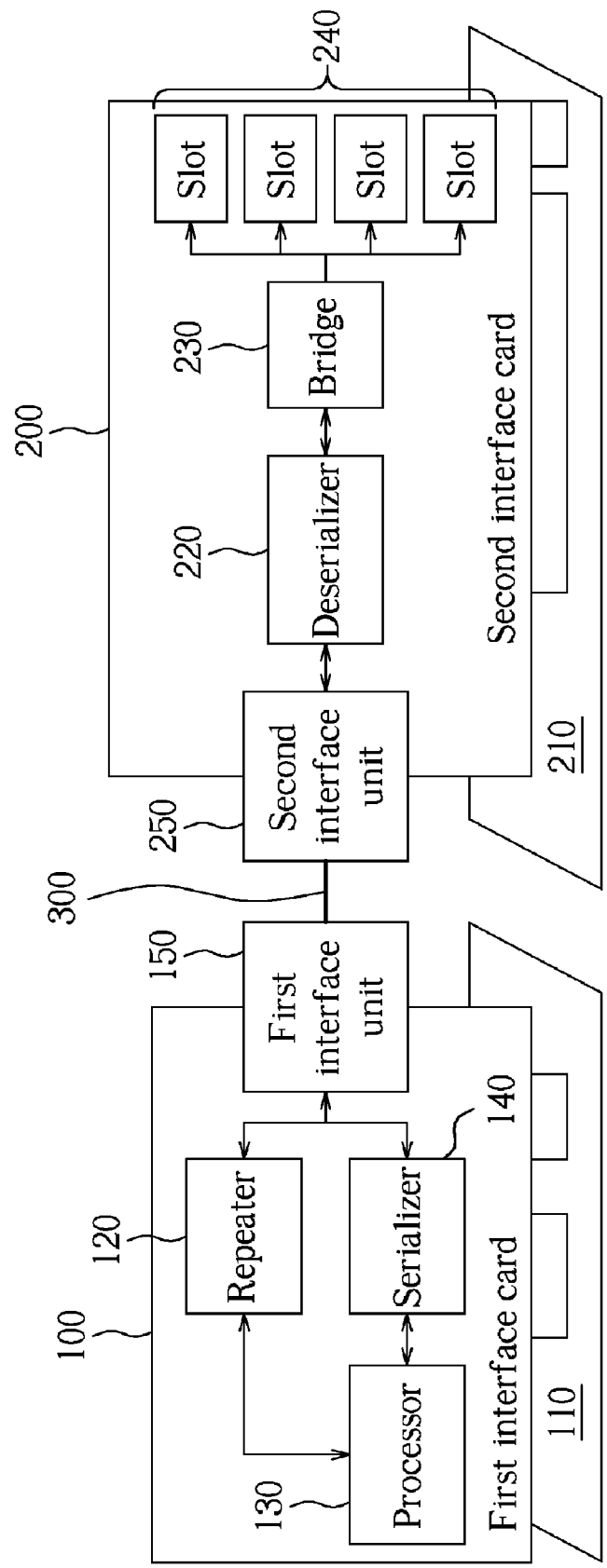

INTERFACE CARD WITH EXTENSIBLE INPUT/OUTPUT INTERFACE

BACKGROUND OF THE INVENTION

1. Field of the Invention

The present invention relates to an interface card with an extensible input/output interface, and more particularly, to an interface card which can transmit a bus signal of a local mainboard to a remote backplane.

2. Description of the Prior Art

The modern computer system has a plurality of slots implemented on the computer mainboard, allowing a user to insert extra input/output interface cards into those slots according to individual needs. The interface card manufacturing companies also design and manufacture many input/output interface cards with different functions. The user can select fitted input/output interface cards according to the slot standard of the computer mainboard, and the input/output interface cards can be inserted into the computer mainboard to execute its designated function.

An industrial personal computer (IPC) is usually utilized in harsh environments, such as a high temperature or high humidity environment. If the interface card and the host computer are implemented indifferent places, the host computer can be implemented and utilized under a better and more stable environment, as only the interface card needs to be implemented in the harsh environment. Thus, the stability of the host computer can be increased and the host computer also retains the convenience of the input/output interface card.

A prior art design utilizes a PCIe (PCI Express) high-speed bus signal to transmit a bus signal on the computer mainboard to the remote input/output interface card via the PCIe transmission line. However, the cost of the PCIe transmission line is very high, and the bus signal will be attenuated after being transmitted over a long distance, resulting in errors.

Therefore, the present invention provides an interface card, which can compensate a transmitted bus signal and transmit bus signals via a common transmission interface and transmission line, to solve the above-mentioned problems.

SUMMARY OF THE INVENTION

One of the objectives of the present invention is to provide an interface card with an extensible input/output interface, which can perform self-calibration operations upon all transmitted bus signals and transmit those bus signals via a common transmission interface.

According to an exemplary embodiment of the present invention, an interface card with an extensible input/output interface is provided. The interface card is used for being inserted into a slot of a mainboard and for transmitting a bus signal to a remote backplane having a plurality of input/output interfaces, including a repeater, a serializer, a processor, and an interface unit. The repeater is used for enhancing the bus signal. The serializer is connected to the repeater and is used for serializing the bus signal. The processor is connected to both the repeater and the serializer and is used for monitoring the transmission of the bus signal and for compensating the bus signal. The interface unit is connected to both the repeater and the serializer and is used for transmitting the serialized bus signal to the remote backplane.

With regard to the exemplary interface card with an extensible input/output interface according to the present invention, the interface unit is a high-definition multimedia interface (HDMI) transmission interface, and the interface card can thereby transmit the high-speed bus signal via the HDMI high-speed transmission line.

According to another exemplary embodiment of the present invention, an interface card with an extensible input/output interface is provided. The interface card is used for being inserted into a slot of a backplane having a plurality of input/output interfaces and for receiving a serialized bus signal transmitted from a remote mainboard, including an interface unit, a deserializer and a bridge. The interface unit is used for receiving the serialized bus signal. The deserializer is connected to the interface unit and is used for deserializing the serialized bus signal. The bridge is connected to the deserializer, for transforming the deserialized bus signal into a signal complying with at least one of the input/output interfaces of the backplane.

The interface card with an extensible input/output interface according to the present invention further includes a plurality of slots connected to the bridge, for receiving a plurality of input/output interface cards inserted therein, and the inserted interface cards can transmit the bus signal to the remote mainboard via a transmission line connected to the interface unit.

These and other objectives of the present invention will no doubt become obvious to those of ordinary skill in the art after reading the following detailed description of the preferred embodiment that is illustrated in the various FIGURES and drawings.

BRIEF DESCRIPTION OF THE DRAWINGS

The FIGURE shows a block diagram of an interface system with an extensible input/output interface according to an exemplary embodiment of the present invention.

DETAILED DESCRIPTION

Please refer to FIG. 1. FIG. 1 is a block diagram of an interface system with an extensible input/output interface according to an exemplary embodiment of the present invention. The interface system includes a first interface card 100 and a second interface card 200. The first interface card 100 is used for being inserted into a slot of a local mainboard 110, and for transmitting a bus signal to a remote backplane 210 having a plurality of input/output interfaces, the first interface card 100 includes a repeater 120, a serializer 140, a processor 130, and a first interface unit 150.

First, the bus signal needs to be enhanced before being transmitted to the remote backplane 210 via a transmission line 300, therefore, the repeater 120 is used for enhancing the bus signal. The serializer 140 is connected to both the repeater 120 and the processor 130, for transmitting a high-speed bus signal via the first interface unit 150. The high-speed bus signal includes differential signals and control signals, wherein the control signals are used for controlling the other input/output interface cards inserted into the remote backplane 210. The serializer 140 is used for serializing the bus signal to decrease the number of control signals in the high-speed bus signal.

The processor 130 is connected to both the repeater 120 and the serializer 140. When the bus signal is transmitted to the remote backplane 210, the bus signal will be attenuated due to the transmission distance is increased. Therefore, the processor 130 is used for monitoring the transmission of the bus signal and for compensating the bus signal when the bus signal is attenuated, thereby the bus signal can be completely transmitted to the remote backplane 210.

The first interface unit 150 is connected to both the repeater 120 and the serializer 140, for receiving the serialized bus signal from the serializer 140 and then transmitting the serialized bus signal to the remote backplane 210 via the transmission line 300.

The second interface card 200 is used for being inserted into a slot of the backplane 210, and for receiving the serialized bus signal transmitted from the remote mainboard 110, the second interface card 200 includes a second interface unit 250, a deserializer 220 and a bridge 230.

The second interface unit 250 is connected to the transmission line 300, for receiving the serialized bus signal transmitted from the remote mainboard 110. The deserializer 220 is connected to the second interface unit 250, the second interface unit 250 will transmit the serialized bus signal to the deserializer 220 when the second interface unit 250 receives the serialized bus signal. Then, the deserializer 220 deserializes the serialized bus signal to generate the bus signal of the first interface card 100.

The bridge 230 is connected to the deserializer 220, for receiving the deserialized bus signal. Because the slot interface of the backplane 210 is not fitted to the slot interface of the mainboard 110, the bridge 230 has bus signal transforming capability to transform the received bus signal into a signal fitted to the input/output interface of the backplane 210.

The second interface card 200 further includes a plurality of slots 240, the slots 240 are all connected to the bridge 230, enabling the bus signal on the mainboard 110 transmitting with the signal on the input/output interface inserted into the slots 240 of the second interface card 200 via the transmission line 300.

In this embodiment, the first interface unit 150 and the second interface unit 250 are implemented by HDMI transmission interfaces, and the present invention utilizes a low cost HDMI transmission line to transmit the high-speed bus signal on the mainboard 110 to the input/output interface inserted into the backplane 210.

Those skilled in the art will readily observe that numerous modifications and alterations of the device and method may be made while retaining the teachings of the invention.

What is claimed is:

1. An interface card system comprising a first interface card with an extensible input/output interface, for inserting into a slot of a mainboard and transmitting a bus signal to a remote backplane having a plurality of input/output interfaces, the first interface card comprising:
   a repeater, for enhancing the bus signal;
   a serializer, connected to the repeater, for serializing the bus signal;
   a processor, connected to the repeater and the serializer, for monitoring a transmission of the bus signal to determine if the bus signal is attenuated and compensating the bus signal when the bus signal is attenuated; and
   a first interface unit, connected to the repeater and the serializer, for transmitting the serialized bus signal to a second interface unit of a remote interface card inserted into a slot of the remote backplane.

2. The interface card of claim 1, wherein the first interface unit and the second interface unit are high-definition multimedia interface (HDMI) transmission interfaces.

3. The interface card system of claim 1, wherein the remote interface card is a second interface card with an extensible input/output interface, for inserting into a slot of the backplane having a plurality of input/output interfaces and receiving the serialized bus signal, the second interface card comprising:
   the second interface unit, for receiving the serialized bus signal from the first interface unit of the first interface card;
   a deserializer, connected to the second interface unit, for deserializing the serialized bus signal; and
   a bridge, connected to the deserializer, for transforming the deserialized bus signal into a signal complying with at least one of the input/output interfaces of the backplane.

* * * * *